(12) United States Patent
Ashok et al.

(10) Patent No.: US 12,019,698 B2
(45) Date of Patent: Jun. 25, 2024

(54) FLIGHT DATA OBJECT REALIZATION WITH GRAPH DATABASE

(71) Applicant: The Boeing Company, Chicago, IL (US)

(72) Inventors: Rahul Ashok, Singapore (SG); Vinko Vidakovic, Neu-Isenburg (DE); Rowena Loh, Singapore (SG); Andreas Godehart, Neu-Isenburg (DE); Ye Sheng Tan, Singapore (SG)

(73) Assignee: The Boeing Company, Chicago, IL (US)

( * ) Notice: Subject to any disclaimer, the term of this patent is extended or adjusted under 35 U.S.C. 154(b) by 11 days.

(21) Appl. No.: 17/844,418

(22) Filed: Jun. 20, 2022

(65) Prior Publication Data

US 2023/0409652 A1    Dec. 21, 2023

(51) Int. Cl.
| | |
|---|---|
| *G06F 16/00* | (2019.01) |
| *G06F 16/901* | (2019.01) |
| *G06F 16/9537* | (2019.01) |
| *G06F 16/9538* | (2019.01) |

(52) U.S. Cl.
CPC ...... *G06F 16/9538* (2019.01); *G06F 16/9024* (2019.01); *G06F 16/9537* (2019.01)

(58) Field of Classification Search
None
See application file for complete search history.

(56) References Cited

U.S. PATENT DOCUMENTS

| | | | | |
|---|---|---|---|---|
| 9,513,125 | B2* | 12/2016 | Ravenscroft | G08G 5/0069 |
| 2016/0203422 | A1* | 7/2016 | Demarchi | G06F 16/29 |
| | | | | 705/6 |
| 2016/0217399 | A1* | 7/2016 | Roelofs | G06Q 10/063116 |
| 2020/0391885 | A1* | 12/2020 | Elshrif | B64F 5/40 |
| 2021/0149957 | A1* | 5/2021 | Grossman | H04L 61/5007 |
| 2022/0028284 | A1* | 1/2022 | Lebbos | G08G 5/0013 |
| 2023/0104886 | A1* | 4/2023 | Rusnak | G01C 21/3461 |
| | | | | 705/338 |

OTHER PUBLICATIONS

Research Into the Usability and Practicalities of Blockchain Technology for the Air Transport Industry, Flight Chain White Paper, SITA, 2017.
Ayhan, Samet and Samet, Hanan; Data Management and Analytics System for Online Flight Conformance Monitoring and Anomaly Detection, Nov. 5-8, 2019, Sigspatial, Chicago, IL.
Thomson, Duncan; Brodie, Steven R.; Bryson, David E.; Luc, Timothy S.; Korb, Joel G.; Flight Object Sharing Capability Using Blockchain, The MITRE Corporation, McLean, VA, 2020.

* cited by examiner

*Primary Examiner* — Bai D Vu
(74) *Attorney, Agent, or Firm* — Quinn IP Law (57) ABSTRACT

A method for flight data object realization includes storing a graph database that defines nodes populated with properties, receiving relationships among data items stored in data stores, transforming the relationships into edges in the graph database, receiving a query to create the flight data object, accessing the graph database, extracting particular properties from the graph database in response to the query, fetching from the data stores particular data items in response to the particular properties, generating the flight data object with the particular data items, creating a visual presentation of the flight data object, and presenting the flight data object.

20 Claims, 7 Drawing Sheets

FLIGHT DATA OBJECT REALIZATION WITH GRAPH DATABASE

TECHNICAL FIELD

The disclosure relates generally to organizing flight data, and in particular, to flight data object realization with a graph database.

BACKGROUND

Current flight data exchanges are not consistent across aviation-related systems. Data related to flights is physically scattered and resides in multiple different heterogeneous sources (operational, maintenance, customer, etc.). The scattered and heterogeneous nature of the data makes searching for and locating specific data tedious. For example, block chain methods could be used for organizing the flight data. However, the block chain methods involve a complete overhaul of the existing data store architectures into a uniform organization that would involve a long and cumbersome process.

Accordingly, those skilled in the art continue with research and development efforts in the field of organizing flight data into a readily searchable format.

SUMMARY

A method for flight data object realization is provided herein. The method includes storing in a first computer a graph database that defines a plurality of nodes populated with a plurality of properties, receiving at the first computer a plurality of relationships among a plurality of data items stored in a plurality of data stores external to the first computer, and transforming the plurality of relationships into a plurality of edges in the graph database. The plurality of edges links the plurality of nodes. The method includes receiving at a second computer a query to create the flight data object. The query defines one or more particular relationships among the plurality of relationships to include in the flight data object. The method further includes accessing the graph database at the second computer, extracting with the second computer one or more particular properties among the plurality of properties from the graph database in response to the query, fetching to the second computer from the plurality of data stores one or more particular data items among the plurality of data items in response to the one or more particular properties, generating the flight data object with the one or more particular data items, creating a visual presentation of the flight data object, and presenting the flight data object from an output device.

In one or more embodiments of the method, plurality of properties includes a plurality of identification values, one or more particular identification values among the plurality of identification values are extracted from the graph database in response to the query, and the one or more particular data items are fetched from the plurality of data stores in further response to the one or more particular identification values.

In one or more embodiments of the method, the plurality of identification values includes an airline value, an aircraft value, an airport value, a runway value, an airspace value, a flight value, a fuel value, a part value, a route value, a crew value, an airline employee value, a weather data value, a system-wide information management value, and an automatic dependent surveillance-broadcast value.

In one or more embodiments of the method, the plurality of properties includes a plurality of location databases, one or more particular location databases among the plurality of location databases are extracted from the graph database in response to the query, and the one or more particular data items are fetched from the plurality of data stores in further response to the one or more particular location databases.

In one or more embodiments of the method, the plurality of location databases includes an airline database, a federal aviation administration database, a weather database, an aircraft database, an airport database, an airspace database, a flights database, a fuel database, a parts database, a routes database, an employee database, and a crew database.

In one or more embodiments of the method, the plurality of properties includes a plurality of status values, one or more particular status values among the plurality of status values are extracted from the graph database in response to the query, and the one or more particular data items are fetched from the plurality of data stores in further response to the one or more particular status values.

In one or more embodiments of the method, the plurality of status values includes an up status and a down status.

In one or more embodiments of the method, the plurality of edges includes a plurality of use links, a plurality of location links, a plurality of content links, a plurality of data type links, and a plurality of derived-from links.

In one or more embodiments of the method, a plurality of architectures of the plurality of data stores is retained unaltered while the graph database is created.

A system is provided herein. The system includes a first computer, a second computer, and an output device. The first computer is configured to store a graph database that defines a plurality of nodes populated with a plurality of properties, receive a plurality of relationships among a plurality of data items stored in a plurality of data stores external to the first computer, and transform the plurality of relationships into a plurality of edges in the graph database. The plurality of edges links the plurality of nodes. The second computer is in communication with the first computer and the plurality of data stores. The second computer is configured to receive a query to create a flight data object. The query defines one or more particular relationships among the plurality of relationships to include in the flight data object, The second computer is configured to access the graph database, extract one or more particular properties among the plurality of properties from the graph database in response to the query, fetch from the plurality of data stores one or more particular data items among the plurality of data items in response to the one or more particular properties, generate the flight data object with the one or more particular data items, and create a visual presentation of the flight data object. The output device is configured to present the visual presentation.

In one or more embodiments of the system, the plurality of properties includes a plurality of identification values, one or more particular identification values among the plurality of identification values are extracted from the graph database in response to the query, and the one or more particular data items are fetched from the plurality of data stores in further response to the one or more particular identification values.

In one or more embodiments of the system, the plurality of properties includes a plurality of location databases, one or more particular location databases among the plurality of location databases are extracted from the graph database in response to the query, and the one or more particular data items are fetched from the plurality of data stores in further response to the one or more particular location databases.

In one or more embodiments of the system, the plurality of properties includes a plurality of status values, one or more particular status values among the plurality of status values are extracted from the graph database in response to the query, and the one or more particular data items are fetched from the plurality of data stores in further response to the one or more particular status values.

In one or more embodiments of the system, the plurality of edges includes a plurality of use links, a plurality of location links, a plurality of content links, a plurality of data type links, and a plurality of derived-from links.

In one or more embodiments of the system, a plurality of architectures of the plurality of data stores is retained unaltered while the graph database is created.

A non-transitory computer readable storage media containing processor executable instructions is provided herein. The processor executable instructions cause a processor to perform the steps of storing in a first computer a graph database that defines a plurality of nodes populated with a plurality of properties, receiving at the first computer a plurality of relationships among a plurality of data items stored in a plurality of data stores external to the first computer, and transforming the plurality of relationships into a plurality of edges in the graph database. The plurality of edges links the plurality of nodes. The instructions perform the steps of receiving at a second computer a query to create the flight data object. The query defines one or more particular relationships among the plurality of relationships to include in the flight data object. The instructions perform the steps of accessing the graph database at the second computer, extracting with the second computer one or more particular properties among the plurality of properties from the graph database in response to the query, fetching to the second computer from the plurality of data stores one or more particular data items among the plurality of data items in response to the one or more particular properties, generating the flight data object with the one or more particular data items, and creating a visual presentation of the flight data object presentable from an output device.

In one or more embodiments of the non-transitory computer readable storage media, the plurality of properties includes a plurality of identification values, one or more particular identification values among the plurality of identification values are extracted from the graph database in response to the query, and the one or more particular data items are fetched from the plurality of data stores in further response to the one or more particular identification values.

In one or more embodiments of the non-transitory computer readable storage media, the plurality of properties includes a plurality of location databases, one or more particular location databases among the plurality of location databases are extracted from the graph database in response to the query, and the one or more particular data items are fetched from the plurality of data stores in further response to the one or more particular location databases.

In one or more embodiments of the non-transitory computer readable storage media, the plurality of properties includes a plurality of status values, one or more particular status values among the plurality of status values are extracted from the graph database in response to the query, and the one or more particular data items are fetched from the plurality of data stores in further response to the one or more particular status values.

In one or more embodiments of the non-transitory computer readable storage media, the plurality of edges includes a plurality of use links, a plurality of location links, a plurality of content links, a plurality of data type links, and a plurality of derived-from links.

The above features and advantages, and other features and advantages of the present disclosure are readily apparent from the following detailed description of the best modes for carrying out the disclosure when taken in connection with the accompanying drawings.

DETAILED DESCRIPTION

Various embodiments of the disclosure generally provide a system and method for realizing flight data objects (FDO) using data accumulated from a variety of non-uniform data stores into a non-relational graph database. The system and/or method stores relationship information in the graph database while retaining an architecture of existing relational databases. Using the technique, existing data stores remain unmodified. Data management is achieved by identifying the data stores and saving relationships between them in a graph database thus helping in easily locating the data while creating the flight data objects. The existing data stores serve as nodes and/or entities in the graph database architecture. The nodes/entities are connected using relationships (e.g., edges) thus facilitating faster traversal between data stores to locate a particular dataset. A query into the graph database identifies particular properties regarding where the requested data is located. The requested data may be fetched from the data stores and used to generate the flight data object. A visual presentation of the flight data object is created and presented on one or more output devices, such as a display and/or a printer.

The flight data objects facilitate capturing, sharing, and streamlining up-to-date information associated with a flight. By saving the existing database architecture of the organization in a non-relational graph database, a single and meaningful view of the data stores is achieved with an overall view of dependencies across multiple databases. Silos between different data stores may also be avoided.

Figure 1:
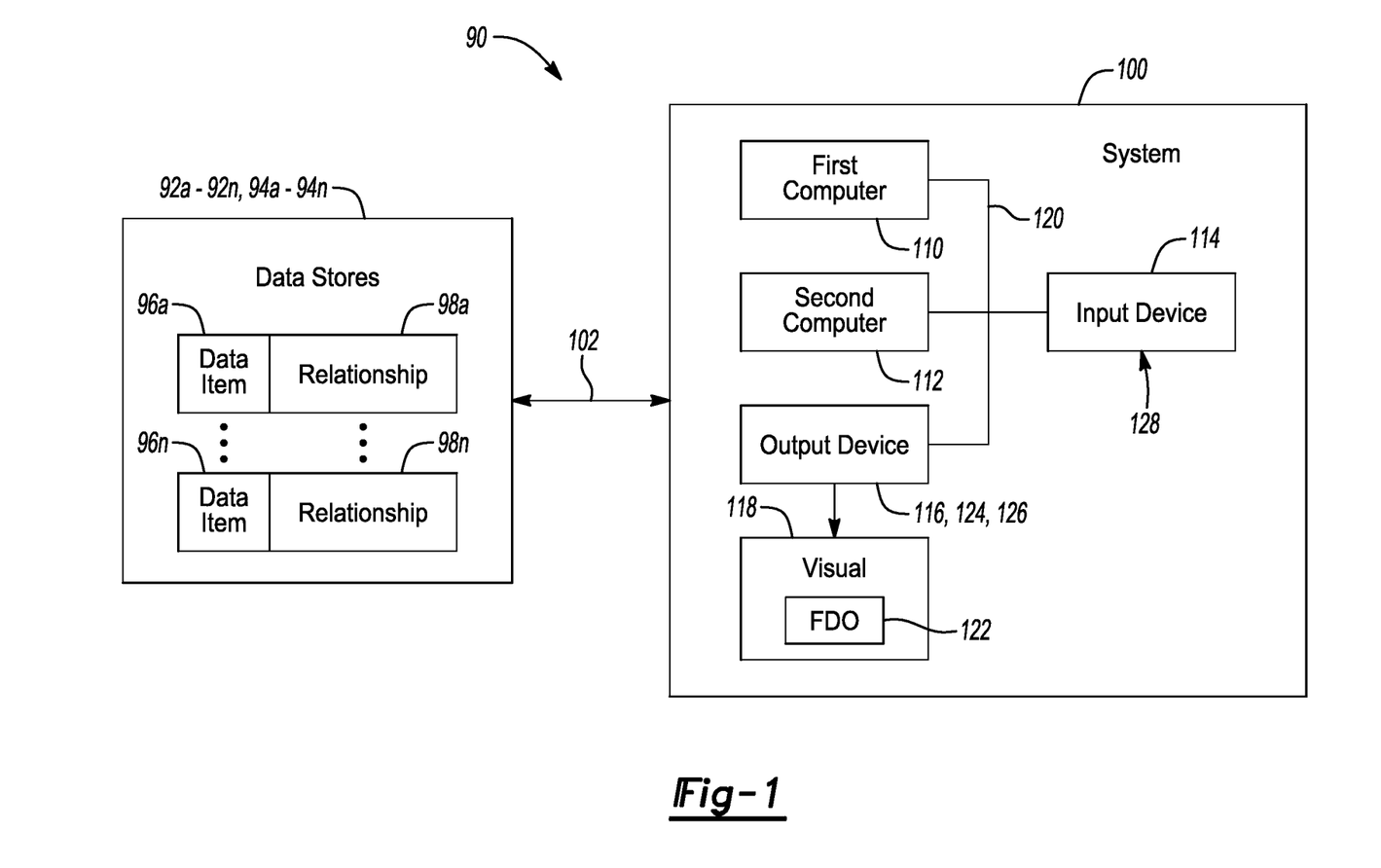
FIG. 1 is a schematic diagram of an environment for realization of flight data objects in accordance with one or more exemplary embodiments.

Referring to FIG. 1, a schematic diagram of an example implementation of an environment 90 for realization of flight data objects is shown in accordance with one or more exemplary embodiments. The environment 90 includes multiple data stores 92a-92n and a system 100. The data stores 92a-92n have respective architectures 94a-94n for storing data items 96a-96n and relationships 98a-98n among the data items 96a-96n. The system 100 includes a network 102, a first computer 110, a second computer 112, an input device 114, an output device 116, and a communication link 120. The output device 116 presented a visual presentation 118 that includes a flight data object 122.

The data stores 92a-92n implement a variety of data storage systems. The data stores 92a-92n may be physically located in multiple facilities external to the system 100. In various embodiments, the data stores 92a-92n are heterogenous relative to each other with varying architectures 94a-94n. The data stores 92a-92n contain the data items 96a-96n. The data items 96a-96n may include information such as operational data, maintenance data, customer data, location data, and the like. The data items 96a-96n are used to populate the flight data objects 122. The relationships 98a-98n define how the data items 96a-96n are related to each other. For example, the maintenance data may be related to airport location data to indicate where specific maintenance personal and specific maintenance equipment are located.

The system 100 implements a network of computers in communication with the data stores 92a-92n through the network 102. Nodes of the network communicate with each other through the communication link 120. The first computer 110 of the system 100 is configured to store, or allocate memory space to store a graph database. The graph database generally defines multiple nodes populated with multiple properties. The first computer 110 receives the relationships 98a-98n among the data items 96a-96n stored in the data stores 92a-92n, and transform the relationship 98a-98n into multiple edges in the graph database. The edges link the nodes of the graph database. The second computer 112 of the system 100 is configured to receive the query 128 from the input device 114 to create the flight data object 122. The query 128 defines one or more particular relationships to include in the flight data object 122. The second computer 112 may access the graph database, extract one or more particular properties from the graph database in response to the query 128, fetch from the data stores 92a-92n one or more particular data items (e.g., 96a) in response to the particular properties, generate the flight data object 122 with the particular data item 96a, and create the visual presentation 118 of the flight data object 122. The output device 116 is configured to present the visual presentation 118 to people (e.g., the person who submitted the query 128).

The network 102 implements a wide-area communication network. The network 102 is operational to transfer information from the system 100 to the data stores 92a-92n, and from the data stores 92a-92n to the system 100. The network 102 may include one or more wired networks and/or one or more wireless networks. In various embodiments, the network 102 may include the Internet, a wide area network, a local area network, and the like.

The input device 114 implements a human machine interface device. The input device 114 is operational to receive a query request from a person (or user). Each request is transferred as a query 128 via the communication link 120 to the second computer 112.

The output device 116 implements a display 124, a printer 126, and/or similar device capable of rendering the flight data object 122 in a human-readable format. The output device 116 is in communication with the second computer 112 via the communication link 120. The flight data object 122 is received by the output device 116 through the communication link 120.

The communication link 120 implements a local communication network. The communication link 120 is operational to transfer information among the first computer 110, the second computer 112, the input device 114, and the output device 116. In various embodiments, the communication link 120 may be a local area network, an Ethernet network, a set of point-to-point networks, a wireless network, or the like.

Figure 2:
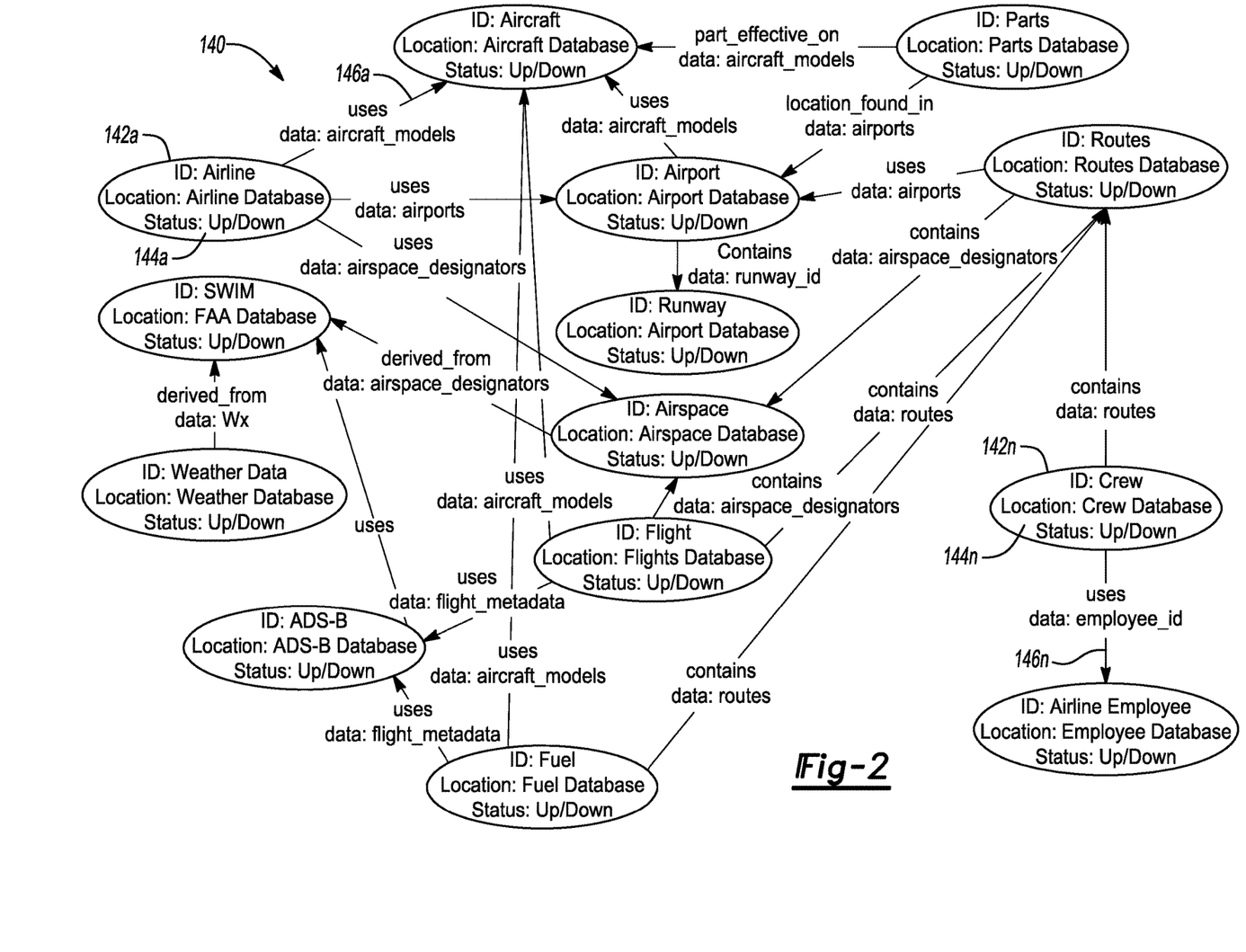
FIG. 2 is a schematic diagram of a graph database in accordance with one or more exemplary embodiments.

Referring to FIG. 2, a schematic diagram of an example implementation of a graph database 140 is shown in accordance with one or more exemplary embodiments. The graph database 140 generally includes multiple nodes 142a-142n related to each other by multiple edges 146a-146n. The nodes 142a-142n represent entities or instances such as a person, a city, an employee, a customer, and the like. The nodes 142a-142n may also be referred to as vertices. The edges 146a-146n map the relationships between the entities/instances. Properties 144a-144n are associated with the corresponding nodes 142a-142n. The flight data object concept provides a streamlined view of the connections between multiple different products. databases, and applications, both internal and external.

Figure 3:
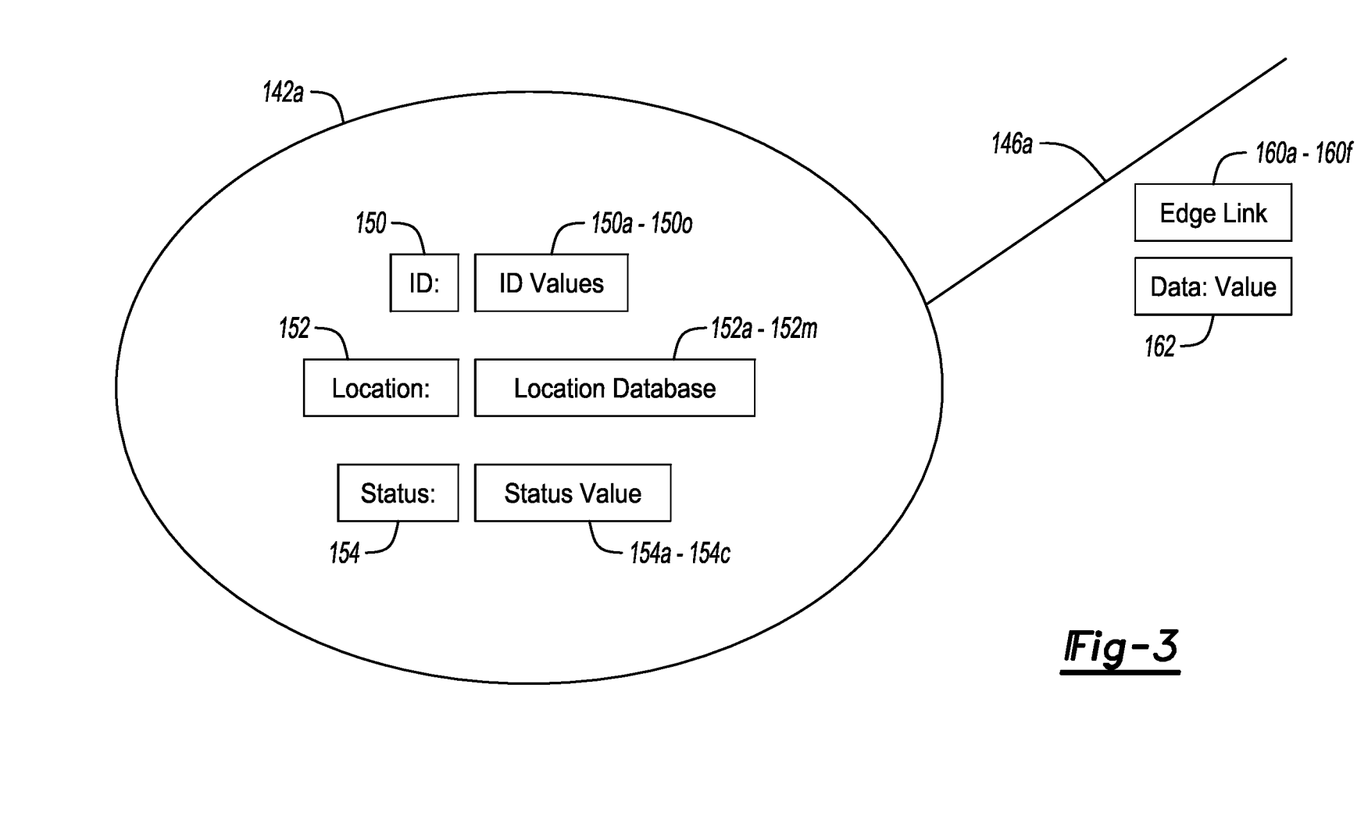
FIG. 3 is a schematic diagram of an example node in the graph database in accordance with one or more exemplary embodiments.

Referring to FIG. 3, a schematic diagram of an example implementation of a particular node (e.g., 142a) in the graph database 140 is shown in accordance with one or more exemplary embodiments. The particular node 142a may be representative of the nodes 142b-142n (see FIG. 2). The particular node 142a may have an identification value 150, a location database 152, and a status value 154.

The identification value 150 may define a type of entity of the particular node 142a. The identification value 150 may correspond to one among multiple identification values 150a-150o. The identification values 150 may include, but are not limited to, a particular identification value 150a, an airline value 150b, an aircraft value 150c, an airport value 150d, a runway value 150e, an airspace value 150f, a flight value 150g, a fuel value 150h, a part value 150i, a route value 150j, a crew value 150k, an airline employee value 150l, a weather data value 150m, a system-wide information management value 150n, and an automatic dependent surveillance-broadcast value 150o. Other identification values 150 may be implemented to meet the design criteria of a particular system.

The location database 152 may define a type of database located at the particular node 142a. The location database 152 may include, but are not limited to, a particular location database 152a, an airline database 152b, a federal aviation administration database 152c, a weather database 152d, an aircraft database 152e, an airport database 152f, an airspace database 152g, a flights database 152h, a fuel database 152i, a parts database 152j, a routes database 152k, an employee database 152l, and a crew database 152m. Other location databases 152 may be implemented to meet the design criteria of a particular system.

The status value 154 defines a current status, condition, or mode of the particular node 142a. The status value 154 may include, but is not limited to, a particular status value 154a, an up status 154b, and a down status 154c. Other status values 154 may be implemented to meet the design criteria of a particular system.

The edge 146a defines a relationship between the particular node 142a and a connected node 142b-142n (see FIG. 2). The edge 146a may include one among multiple links 160a-160f, and a corresponding edge data value 162. The links may include, but are not limited to a use link 160a, a location link 160b, a content link 160c, a data type link 160d, a derived-from link 160e, and a part effectiveness link 160f. Other links may be implemented to meet the design criteria of a particular system.

Figure 4:
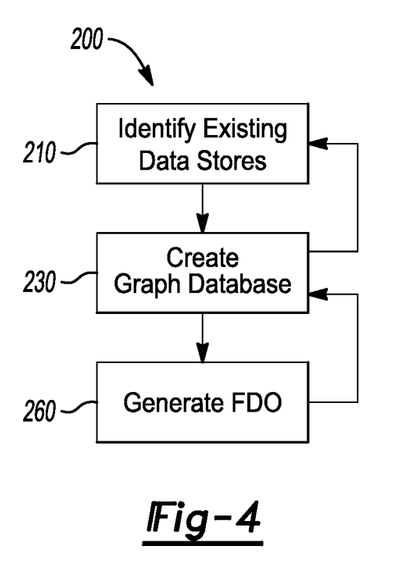
FIG. 4 is a flow diagram of a method for generating a flight data object in accordance with one or more exemplary embodiments.

Referring to FIG. 4, a flow diagram of an example method 200 for generating a flight data object 122 is shown in accordance with one or more exemplary embodiments. The method (or process) 200 may be carried out by the system 100 with some manual operations. The method 200 includes steps 210-260, as illustrated.

In the step 210, the existing data stores 92a-92n in the organization may be manually identified and the relationships between the data stores 92a-92n may be defined. The identification is a one-time process and only changes whenever an additional data store 92a-92n is added to the environment 90. In various embodiments, a spreadsheet file may be used to document the data stores 92a-92n and the relationships therebetween.

A graph database (e.g., graph database 140) may be created in the step 230. From a web-based administration interface for graph database 140, the spreadsheet file created in the step 210 may be located and the contents thereof are automatically imported into the graph database 140 with nodes and relationship information. The individual data stores 92a-92n may be represented in the graph database 140 as the nodes 142a-142n. The nodes 142a-142n may include the identification values 150, the location databases 152, and the status values 154. The relationships among the data stores 92a-92n identified in the step 210 may form the edges 146a-146n that link the nodes 142a-142n.

In the step 260, the system 100 may generate a flight data object 122 based on a query 128 entered by an operator. To create the flight data object 122, the operator queries the graph database 140 for relationships, use a particular identification value 150a and a particular location database 152a to fetch actual data. The query 128 generally depends on the entity creating the flight data object 122.

Upon receipt of the query 128, the system 100 (e.g., the second computer 112) identifies the datasets appropriate for creation of the flight data object 122. The datasets in the graph database 140 are searched, and the location of the one or more data stores 92a-92n where the details are stored is returned. Once the appropriate data stores 92a-92n are known, the system 100 may access the data stores 92a-92n for the requested information. After the requested information is received, the system 100 uses the received information to assemble the flight data object 122. The flight data object 122 may subsequently be presented in the visual presentation 118 by the output device 116.

Figure 5:
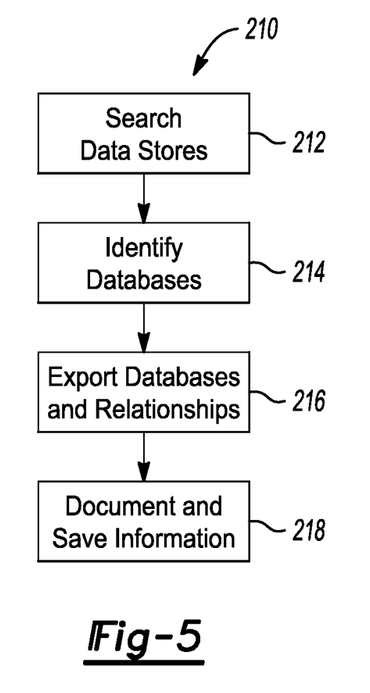
FIG. 5 is a flow diagram for identifying existing data stores in accordance with one or more exemplary embodiments.

Referring to FIG. 5, a flow diagram of an example implementation of the step 210 for identifying existing data stores 92a-92n is shown in accordance with one or more exemplary embodiments. The step 210 may be performed manually. The step (or process) 210 includes steps 212 to 218, as illustrated. The sequence of steps is shown as a representative example. Other step orders may be implemented to meet the criteria of a particular application.

In the step 212, the data stores 92a-92n may be searched to determine which are considered to be within the environment 90. The data items 96a-96n and the relationships 98a-98n of the data stores 92a-92n are identified in the step 214. In the step 216 the data items 96a-96n and the relationships 98a-98n are exported from the data stores 92a-92n. The data items 96a-96n and the relationships 98a-98n are documents and saved in a file in the step 218.

Figure 6:
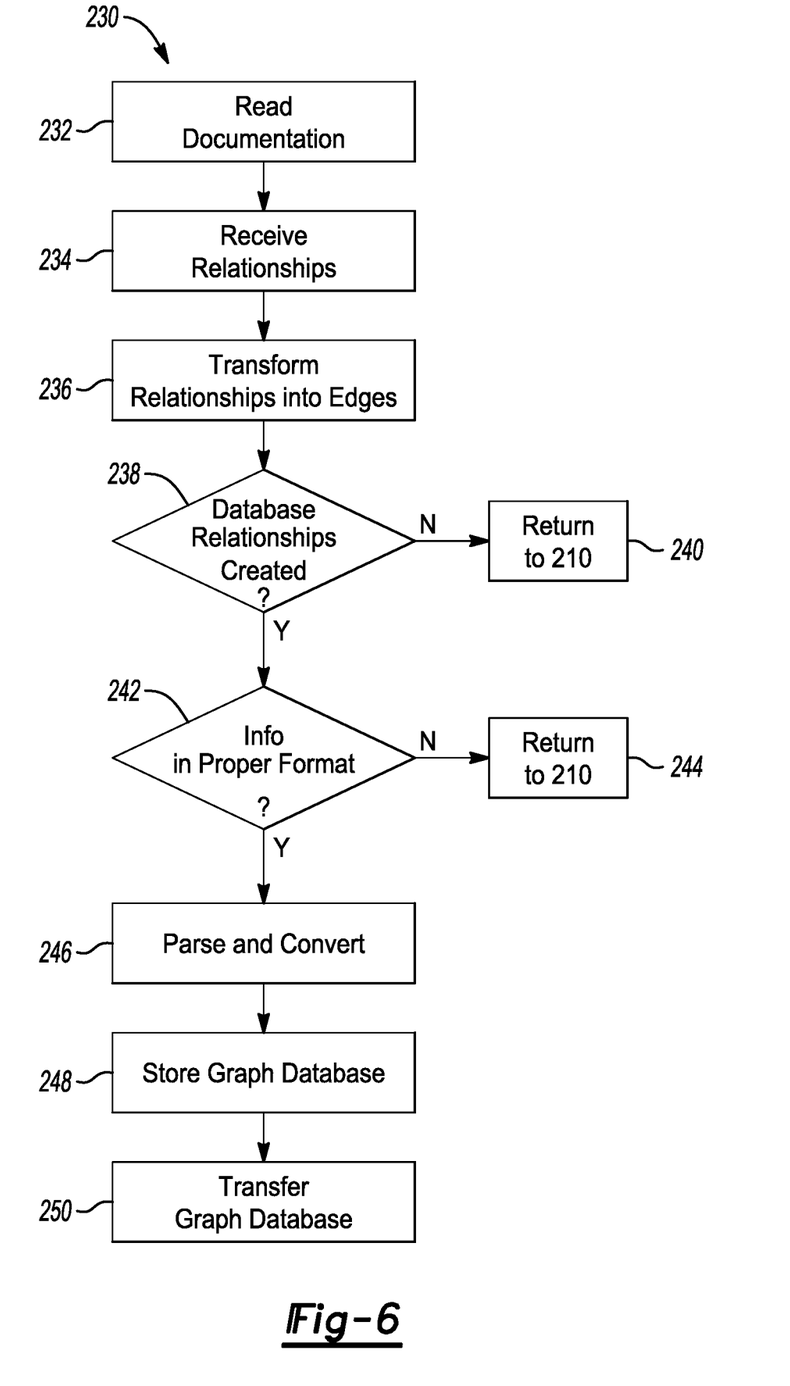
FIG. 6 is a flow diagram for creating the graph database in accordance with one or more exemplary embodiments.

Referring to FIG. 6, a flow diagram of an example implementation of the step 230 for creating the graph database 140 is shown in accordance with one or more exemplary embodiments. The step (or process) 230 may be implemented by the system 100. The step 230 includes steps 232 to 250, as illustrated. The sequence of steps is shown as a representative example. Other step orders may be implemented to meet the criteria of a particular application.

In the step 232, the data stored in the file created in the step 218 (see FIG. 5) may be read and stored in a graph database 140. The system 100 (e.g., the first computer 110) may receive the relationships 98a-98n among the data items 96a-96n held externally in the data stores 92a-92n in the step 234. The system 100 transforms the relationships 98a-98n into the edges 146a-146n in the graph database 140 in the step 236.

In the step 238, a check is performed by the first computer 110 to verify that the relationships 98a-98n to be used to link the nodes 142a-142n in the graph database 140 are present. If one or more relationships 98a-98n are missing, the system 100 may return to the step 210 to document the missing relationships 98a-98n in the step 240. Once the full relationships 98a-98n are present, a check may be performed in the step 242 to determine if the data items 96a-96n to be used to populate the graph database 140 are in proper format. If improperly formatted data items 96a-96n are found during the check, the system 100 may return to the step 210 to obtain properly formatted information in the step 244.

Once the data items 96a-96n are present per the step 242, the system 100 parses the data items 96a-96n and the relationships 98a-98n from the spreadsheets and converts the information into a predetermined format (e.g., the identification values 150, the location databases 152, and the status values 154) of the graph database 140 in the step 246. In the step 248, the graph database 140 is stored in the first computer 110. A copy of the graph database 140 may subsequently be transferred from the first computer 110 to the second computer 112 in the step 250.

Figure 7:
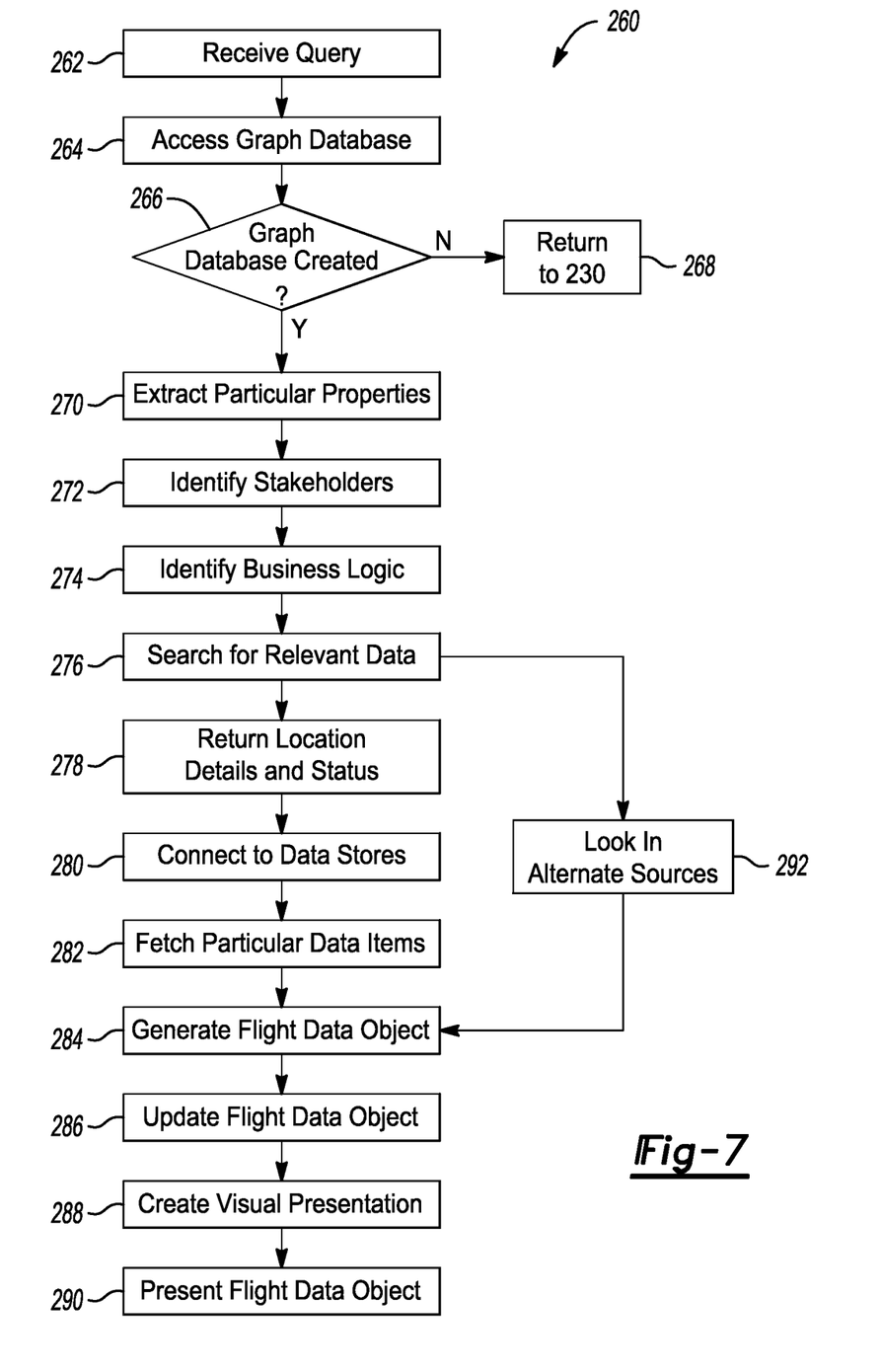
FIG. 7 is a flow diagram for generating the flight data object in response to a query in accordance with one or more exemplary embodiments.

Referring to FIG. 7, a flow diagram of an example implementation of the step 260 for generating a flight data object 122 is shown in accordance with one or more exemplary embodiments. The step (or process) 260 may be implemented by the system 100. The step 260 includes steps 262 to 292, as illustrated. The sequence of steps is shown as a representative example. Other step orders may be implemented to meet the criteria of a particular application.

In the step 262, the query 128 to create the flight data object 122 may be received at the second computer 112 from the input device 114. The query 128 generally defines one or more particular relationships (e.g., 98a) among the relationships 98a-98n to include in the flight data object 122. The second computer 112 may access the graph database 140 stored within in response to receiving the query 128 in the step 264. A check may be performed in the step 266 to verify that the graph database 140 is present and in proper format. If the graph database 140 is absent or incorrect, the system 100 may return to the step 230 in the step 268 to complete the graph database 140.

If the graph database 140 is present and correct in the step 266, the second computer 112 may extract one or more particular properties (e.g., 144a) among the properties 144a-144n (see FIG. 2) from the graph database 140 in response to the query 128 in the step 270. The second computer 112 may identify stakeholders in the step 272, and identify business logic in the step 274 based on the query 128.

In the step 276, a search may be formed in the graph database 140 for data relevant to the query 128. If found, the search may return location details and status of the data stores 92a-92n in the step 278. Knowing the data store locations and statuses, the second computer 112 may connect to the appropriate data stores 92a-92n in the step 280. A query of the connected data stores 92a-92n is performed in the step 282 to fetching the particular data items 96a among the data items 96a-96n to the second computer 112 in response to the one or more particular properties 144a.

In the step 284, the second computer 112 may generate the requested flight data object 122 using the particular data items 96a received from the data stores 92a-92n. If appropriate, the second computer 112 may update the flight data object 122 with additional data from other sources in the step 286. A visual presentation 118 of the flight data object 122 is generated in the step 288. The visual presentation 118 may be presented from the output device 116 in the step 292.

If the search in the step 276 does not find the location details and/or the status of the data stores 92a-92n is down, the second computer 112 may search in alternate sources for the requested data items 96a-96n in the step 292. Thereafter, the data items 96a-96n may be used to generate the flight data object 122 in the step 284. The visual presentation 118 is created in the step 288, then presented in the step 290. After the visual presentation 118 with the requested flight data object 122 is displayed and/or printed, the second computer 112 may return to the step 262 and wait to receive a new query 128 for a new flight data object 122.

Figure 8:
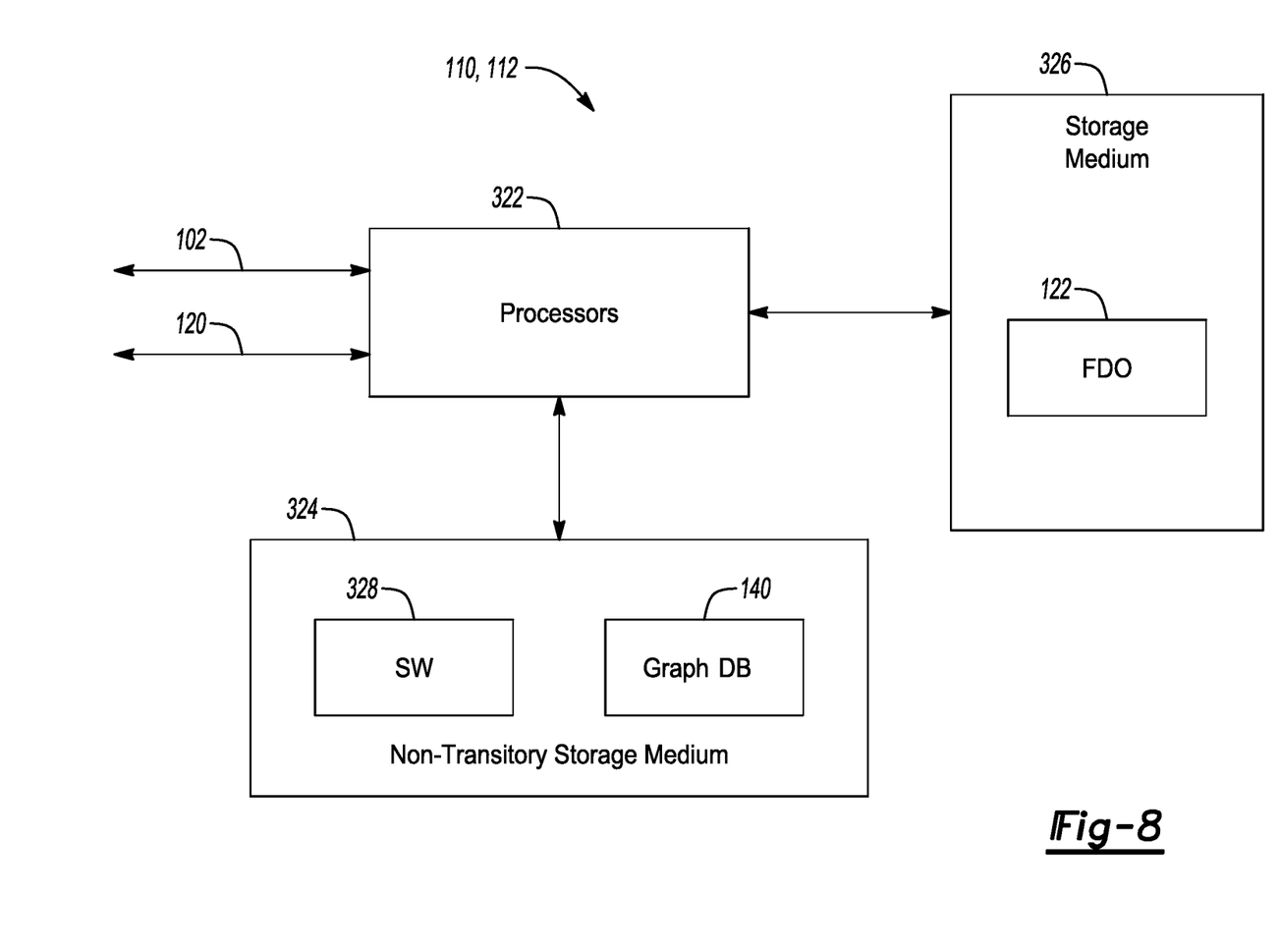
FIG. 8 is a schematic diagram of the computers in accordance with one or more exemplary embodiments.

Referring to FIG. 8, a schematic diagram of an example implementation of the first computer 110 and the second computer 112 is shown in accordance with one or more exemplary embodiments. The first computer 110 and the second computer 112 may include one or more processors 322, a non-transitory storage medium 324 and another storage medium 326. The processors 322 may communicate bi-directionally on the communication link 120. The processors 322 of the first computer 110 may also communicate bi-directionally via the network 102.

The non-transitory storage medium 324 may hold one or more instructions 328 (or software programs) executed by the processors 322 to perform the method 230 (first computer 110) and the method 260 (second computer 112). The graph database 140 may be stored in the non-transitory storage medium 324, as illustrated, and/or in the storage medium 326. The flight data object 122 generally reside in the storage medium 326.

The instructions 328 in the first computer 110 may be read and executed by the processors 322 to implement the process of assembling the graph database 140. The instructions 328 in the second computer 112 may be read and executed by the processors 322 to implement the process of generating the visual presentation 118 with the flight data object 122 based on the query 128.

The flight data objects 122 provide tangible benefits to aviation communities in terms of interoperability, harmonization, and data management. The flight data objects 122 provide single, meaningful view of the diverse data stores 92a-92n. The meaningful views allow for impact analysis, dependency identifications, avoid silos among different data repositories, link the data stores 92a-92n, provides a common point of reference, and provides data consistency across organizations.

The system 100 is scalable in the environment 90 regardless of the size, number and type of data stores 92a-92n. By forming a relationship graph of the existing data stores 92a-92n, a single and meaningful view of the data stores 92a-92n is available. Thus, the system 100 helps make the process of locating and identifying the flight data a faster process. The system 100 may be used by aviation related organizations to realize the concept of flight data object in a short span of time without making changes to existing database architecture. The system 100 may also serve as an add-on for organizations that are already using concepts like flight-key, by enhancing the performance by means of faster data searches.

This disclosure is susceptible of embodiments in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Background, Summary, and Detailed Description sections, but not explicitly set forth in the claims, should not be incorporated into the claims, singly or collectively, by implication, inference or otherwise.

For purposes of the present detailed description, unless specifically disclaimed, the singular includes the plural and vice versa. The words "and" and "or" shall be both conjunctive and disjunctive. The words "any" and "all" shall both mean "any and all", and the words "including," "containing," "comprising," "having," and the like shall each mean "including without limitation." Moreover, words of approximation such as "about," "almost," "substantially," "approximately," and "generally," may be used herein in the sense of "at, near, or nearly at," or "within 0-5% of," or "within acceptable manufacturing tolerances," or other logical combinations thereof. Referring to the drawings, wherein like reference numbers refer to like components.

The detailed description and the drawings or FIGS. are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment may be combined with one or a plurality of other desired characteristics from other embodiments, resulting in other embodiments not described in words or by reference to the drawings. Accordingly, such other embodiments fall within the framework of the scope of the appended claims.

What is claimed is:

1. A method for flight data object realization comprising:
   storing in a first computer a graph database that defines a plurality of nodes, wherein the plurality of nodes are populated with a plurality of properties, the plurality of properties include a plurality of identification values and a plurality of location databases and a plurality of status values, the plurality of identification values includes an aircraft value, the plurality of location databases includes an aircraft database, and the plurality of status values includes an up status of each of the plurality of nodes;
   receiving at the first computer a plurality of relationships among a plurality of data items stored in a plurality of data stores external to the first computer;
   transforming the plurality of relationships into a plurality of edges in the graph database, wherein the plurality of edges links the plurality of nodes;
   receiving at a second computer a query to create the flight data object, wherein the query defines one or more particular relationships among the plurality of relationships to include in the flight data object;

accessing the graph database at the second computer;
extracting with the second computer one or more particular properties among the plurality of properties from the graph database in response to the query;
fetching to the second computer from the plurality of data stores one or more particular data items among the plurality of data items in response to the one or more particular properties;
generating with the second computer the flight data object with the one or more particular data items;
creating with the second computer a visual presentation of the flight data object; and
presenting the flight data object from an output device.

2. The method according to claim 1, wherein:
one or more particular identification values among the plurality of identification values are extracted from the graph database in response to the query; and
the one or more particular data items are fetched from the plurality of data stores in further response to the one or more particular identification values.

3. The method according to claim 1, wherein the plurality of identification values further includes an airline value, an airport value, a runway value, an airspace value, a flight value, a fuel value, a part value, a route value, a crew value, an airline employee value, a weather data value, a system-wide information management value, and an automatic dependent surveillance-broadcast value.

4. The method according to claim 1, wherein:
one or more particular location databases among the plurality of location databases are extracted from the graph database in response to the query; and
the one or more particular data items are fetched from the plurality of data stores in further response to the one or more particular location databases.

5. The method according to claim 1, wherein the plurality of location databases further includes an airline database, a federal aviation administration database, a weather database, an airport database, an airspace database, a flights database, a fuel database, a parts database, a routes database, an employee database, and a crew database.

6. The method according to claim 1, wherein:
one or more particular status values among the plurality of status values are extracted from the graph database in response to the query; and
the one or more particular data items are fetched from the plurality of data stores in further response to the one or more particular status values.

7. The method according to claim 1, wherein the plurality of status values further includes a down status of each of the plurality of nodes.

8. The method according to claim 1, wherein the plurality of edges includes a plurality of use links, a plurality of location links, a plurality of content links, a plurality of data type links, and a plurality of derived-from links.

9. The method according to claim 1, wherein a plurality of architectures of the plurality of data stores is retained unaltered while the graph database is created.

10. A system comprising:
a first computer configured to:
store a graph database that defines a plurality of nodes, wherein the plurality of nodes are populated with a plurality of properties, the plurality of properties include a plurality of identification values and a plurality of location databases and a plurality of status values, the plurality of identification values includes an aircraft value the plurality of location databases includes an aircraft database, and the plurality of status values includes an up status of each of the plurality of nodes;
receive a plurality of relationships among a plurality of data items stored in a plurality of data stores external to the first computer; and
transform the plurality of relationships into a plurality of edges in the graph database, wherein the plurality of edges links the plurality of nodes;
a second computer in communication with the first computer and the plurality of data stores, the second computer is configured to:
receive a query to create a flight data object, wherein the query defines one or more particular relationships among the plurality of relationships to include in the flight data object;
access the graph database;
extract one or more particular properties among the plurality of properties from the graph database in response to the query;
fetch from the plurality of data stores one or more particular data items among the plurality of data items in response to the one or more particular properties;
generate the flight data object with the one or more particular data items; and
create a visual presentation of the flight data object; and
an output device configured to present the visual presentation.

11. The system according to claim 10, wherein:
one or more particular identification values among the plurality of identification values are extracted from the graph database in response to the query; and
the one or more particular data items are fetched from the plurality of data stores in further response to the one or more particular identification values.

12. The system according to claim 10, wherein:
one or more particular location databases among the plurality of location databases are extracted from the graph database in response to the query; and
the one or more particular data items are fetched from the plurality of data stores in further response to the one or more particular location databases.

13. The system according to claim 10, wherein:
one or more particular status values among the plurality of status values are extracted from the graph database in response to the query; and
the one or more particular data items are fetched from the plurality of data stores in further response to the one or more particular status values.

14. The system according to claim 10, wherein the plurality of edges includes a plurality of use links, a plurality of location links, a plurality of content links, a plurality of data type links, and a plurality of derived-from links.

15. The system according to claim 10, wherein a plurality of architectures of the plurality of data stores is retained unaltered while the graph database is created.

16. A non-transitory computer readable storage media containing processor executable instructions that cause a processor to perform the steps of:
storing in a first computer a graph database that defines a plurality of nodes, wherein the plurality of nodes are populated with a plurality of properties, the plurality of properties include a plurality of identification values and a plurality of location databases and a plurality of status values, the plurality of identification values includes an aircraft value, the plurality of location databases includes an aircraft database, and the plurality of status values includes an up status of each of the plurality of nodes;

receiving at the first computer a plurality of relationships among a plurality of data items stored in a plurality of data stores external to the first computer;

transforming in the first computer the plurality of relationships into a plurality of edges in the graph database, wherein the plurality of edges links the plurality of nodes;

receiving at a second computer a query to create a flight data object, wherein the query defines one or more particular relationships among the plurality of relationships to include in the flight data object;

accessing the graph database at the second computer;

extracting with the second computer one or more particular properties among the plurality of properties from the graph database in response to the query;

fetching to the second computer from the plurality of data stores one or more particular data items among the plurality of data items in response to the one or more particular properties;

generating with the second computer the flight data object with the one or more particular data items; and creating with the second computer a visual presentation of the flight data object presentable from an output device.

17. The non-transitory computer readable storage media according to claim 16, wherein:

one or more particular identification values among the plurality of identification values are extracted from the graph database in response to the query; and the one or more particular data items are fetched from the plurality of data stores in further response to the one or more particular identification values.

18. The non-transitory computer readable storage media according to claim 16, wherein:

one or more particular location databases among the plurality of location databases are extracted from the graph database in response to the query; and the one or more particular data items are fetched from the plurality of data stores in further response to the one or more particular location databases.

19. The non-transitory computer readable storage media according to claim 16, wherein:

one or more particular status values among the plurality of status values are extracted from the graph database in response to the query; and the one or more particular data items are fetched from the plurality of data stores in further response to the one or more particular status values.

20. The non-transitory computer readable storage media according to claim 16, wherein the plurality of edges includes a plurality of use links, a plurality of location links, a plurality of content links, a plurality of data type links, and a plurality of derived-from links.

\* \* \* \* \*